April 30, 1946. C. BEIRD 2,399,315
LATHE ATTACHMENT FOR MAKING DUPLICATE PIECES
Filed July 28, 1944 3 Sheets-Sheet 2
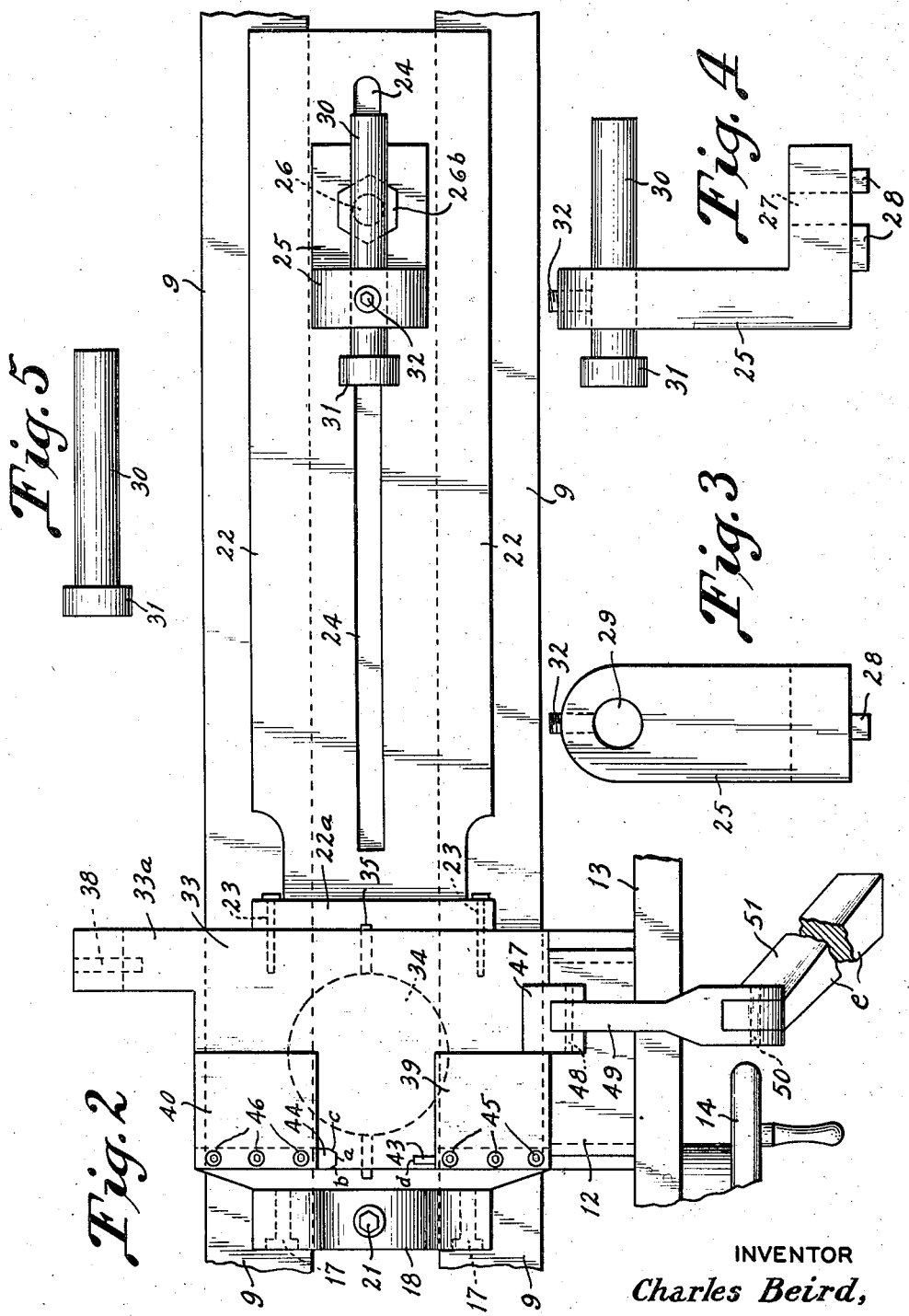
INVENTOR
Charles Beird,
M. Y. Charles
ATTORNEY

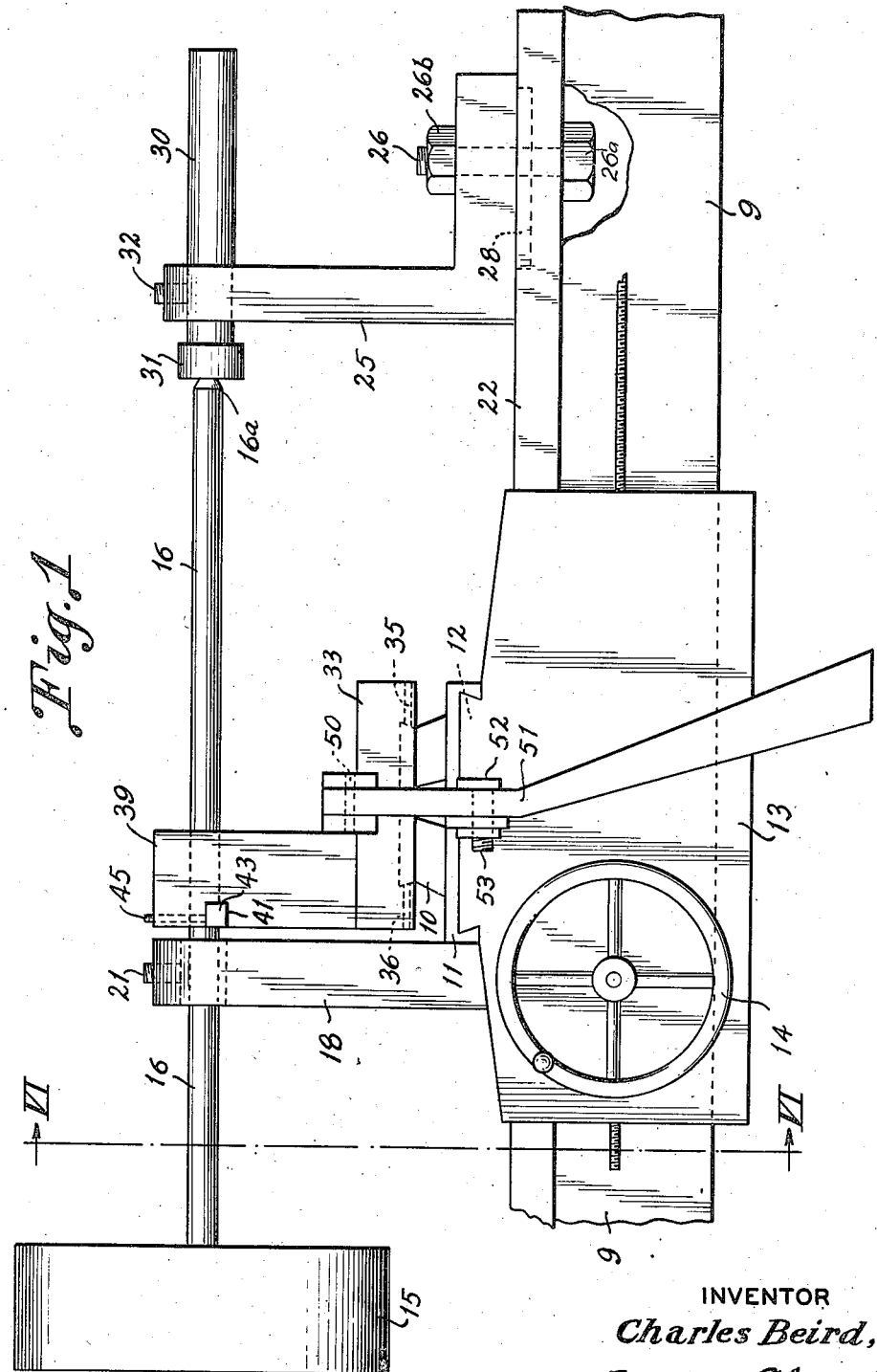
INVENTOR
Charles Beird,
M. Y. Charles
ATTORNEY

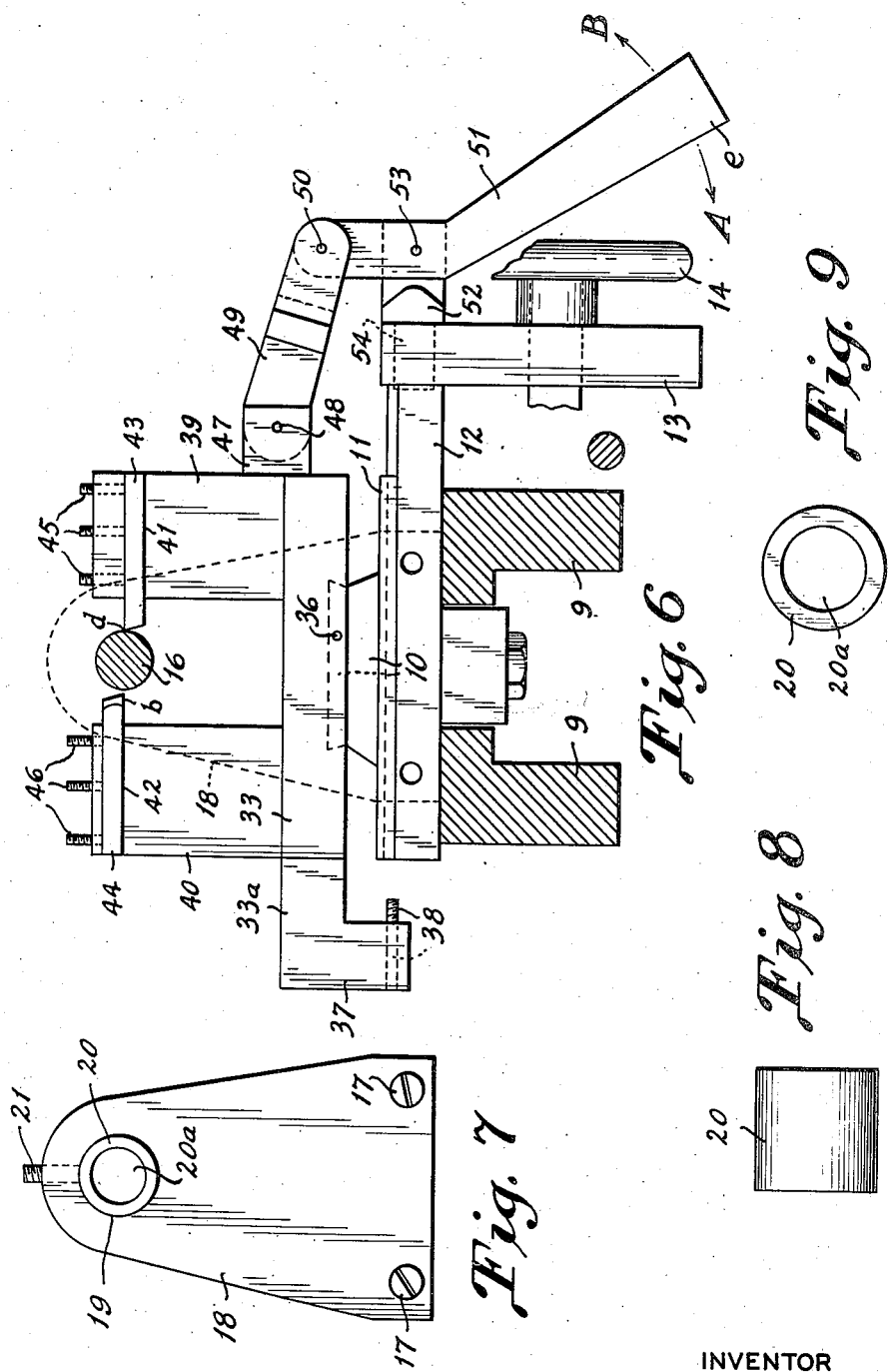

Patented Apr. 30, 1946

2,399,315

UNITED STATES PATENT OFFICE 2,399,315

LATHE ATTACHMENT FOR MAKING DUPLICATE PIECES

Charles Beird, Wichita, Kans.

Application July 28, 1944, Serial No. 546,948

2 Claims. (Cl. 82—25)

My invention relates to an improvement in lathe attachments for making duplicate pieces. The object of my invention is to provide an attachment for a lathe whereby one or more cutters or tools may be held in working position before the work and each tool may be quickly brought into consecutive engagement with the work whereby the operation of each tool may be quickly completed and the piece made.

A further object is to provide a lathe attachment of the kind mentioned that is movable along the bed of the lathe so that duplicate pieces of work may be cut from the stock material held in the lathe without remounting the stock material in the lathe chuck for each piece made.

A still further object is to provide a lathe attachment of the kind mentioned in which means is provided for measuring and setting a predetermined length or distance from the end of the stock of material to the cutting tool so that duplicate lengths of work may be cut from the stock.

A still further object is to provide a lathe attachment of the kind mentioned wherein the ends of the pieces made may be formed or chamfered in any desirable shape such as that of the cutter or tool held in the lathe attachment.

A still further object is to provide a lathe attachment of the kind mentioned whereby the stock material may be held and revolved by the lathe chuck and the lathe attachment will support the material at all times immediately adjacent the cutting tool so as to avoid any chattering of the stock during the operation of the tool in the stock.

A still further object is to provide a lathe attachment of the kind mentioned wherein variable size guide supports may be mounted for supporting the stock immediately adjacent the cutting tools.

A still further object is to provide a lathe attachment of the kind mentioned that is simple, easy and quick to apply to the lathe, one that is highly efficient, accurate in its work, durable and long lived as well as being inexpensive. These and other objects will be more fully described as this description progresses.

Now referring to the accompanying drawings:

Fig. 1 is a front elevational view of my improved lathe attachment and showing an indication of the lathe chuck and stock material being held therein and also being supported in the lathe attachment in working position.

Fig. 2 is a top plan view of my improved lathe attachment shown in Fig. 1.

Fig. 3 is a face view of the stock stop support, the stop being removed therefrom for convenience of illustration.

Fig. 4 is a side view of the stock stop support, the stop being shown therein.

Fig. 5 is a detail side view of the stock stop.

Fig. 6 is an end view my improved lathe attachment, the view being taken along the line VI—VI in Fig. 1 and looking in the direction of the arrows, the stock support being removed for convenience of illustration.

Fig. 7 is a detail face view of the stock support.

Fig. 8 is a side view of the support backing held in the stock support.

Fig. 9 is an end view of the stock support bushing shown in Fig. 7.

Similar numerals of reference designate the same parts throughout the several figures of the drawings.

In the drawings is shown a standard lathe compound support 10 that is integrally formed on a compound support plate 11 that is dovetailed to, and is slidable on the carriage 12 of the lathe and transverse the ways 9 of the lathe. At 13 is shown the apron of the lathe which is rigidly attached to the carriage 12 in the usual manner, and at 14 is shown the conventional hand wheel for the moving of the carriage 12 along the ways of the lathe. At 15 is represented the chuck of the lathe in which is rigidly held the stock or work 16 that is to be revolved by the chuck for working purposes as will later be explained.

Rigidly attached to the carriage 12 by means of screws 17 is a stock or work support element 18 in which is a hole 19 that is in axial alignment with the chuck 15 and in which is seated an adaptor sleeve 20 that is rigidly held in position by means of a screw 21 that is threaded in the support element 18 and the end of which bears against the adaptor 20. The adaptor 20 may be removed from the work support 18 and replaced with other adaptors having different sized holes 20a therein to fit variable size work 16 that may be passed therethrough and supported for cutting purposes as will later be explained.

On the other side of the carriage 12 is a carriage extension element 22, one end of which is turned upwardly as indicated at 22a and is rigidly attached to the carriage 12 by means of screws 23. The carriage extension 22 is provided with a longitudinaly extending slot 24.

Adjustably positioned on the carriage extension 22 is an L-shaped work stop support 25 that is locked in its adjusted position to the carriage extension 22 by means of a bolt 26 which passses through a hole 27 in the foot of the L-shaped formation 25, with the head 26a of the bolt 26 resting against the bottom of the carriage extension 22, and a nut 26b is threaded on the upper end of the bolt 26 and engages the upper side of the foot of the L-shaped element 25 to rigidly clamp the L-shaped piece 25 in its adjusted position on the carriage extension 22. The bottom of the foot of the L-shaped formation 25 is provided with a downwardly extending tongue element 28 that is positioned in the slot 24 and functions to keep the L-shaped piece 25 in proper alignment on the carriage extension 22. The upper end of the vertical leg of the L-shaped stock support element 25 is provided with a hole 29 that is in axial alignment with the chuck 15 and the hole 19 in the work support element 18.

Slidably positioned in the hole 29 is the shaft 30 of a stop element. One end of the shaft 30 is provided with a head 31 against which the end of the stock or work 16 may be abutted for purposes that will later be made obvious. At 32 is shown a screw that is threaded through the upper end of the vertical leg of the stop support 25 and bears against the shaft 30 as a means of locking the shaft 30 in adjusted position in the stop support element 25.

At 33 is shown a tool holder support plate, the bottom side of which is provided with a circular shaped recess indicated by the dotted circle 34 and in which is seated the upper end of the compound support 10. The plate 33 is rigidly held in position on the compound support 10 by means of screws 35 and 36 that are threaded into the tool support plate 33 and bear against the compound support 10 to rigidly bind and hold the tool support plate 33 on the compound support 10. The back side of the tool support plate 33 is provided with a rearwardly extending leg 33a, the outer end of which is turned downwardly as at 37, and at 38 is an adjusting screw threaded through the downwardly turned portion 37, the screw 38 being in alignment with the compound support plate 12 and being engageable therewith as and for reasons that will later be made obvious. Rigidly attached to or preferably integrally formed on the tool support plate 33 is a pair of tool holders 39 and 40 that project upwardly from the tool support plate 33 and are spaced apart and being positioned one on either side of the axis of the chuck 15, hole 19 in the work support 18 and the hole 29 in the stop support 25. Each tool support 39 and 40 is provided with grooves 41 and 42 that are parallel with each other and the bottom face of one groove lies in the same plane as the upper face of the other groove and in these grooves is positioned opposing tools 43 and 44, the cutting edges of which straddle the stock or work 16 that is held and revolved by the chuck 15 as shown in Figures 6 and 2. The tools 43 and 44 are tightly held in their adjusted position in their respective grooves 41 and 42 by means of screws 45 and 46 and are threaded through their respective tool supports 39 and 40 and bear against their respective tool 43 and 44 to rigidly hold the tool as will be readily understood.

The tool 44 as shown in Fig. 2 is a tool for cutting chamfers and has three cutting edges a, b and c, the edge a being positioned parallel to the work 16 while the other two edges b and c are set at an angle to the edge a so that as the tool 44 is brought into engagement with the work 16 the tool 44 will make a V-shaped cut with a flat bottom in the work, the sides of the V being the chamfer on the ends of two adjacent pieces that are later to be cut apart.

The tool 43 has only one cutting edge d that is positioned parallel to the work 16 and is the same width as the edge a on the tool 44 and is used as a cut off tool as will later be explained.

Rigidly attached to the tool support plate 33 is a pivotal mounting 47 in which is pivotally mounted on a pin 48 one end of a link 49. The other end of the link 49 is pivotally connected by means of a pin 50 to the upper end of a cantilever element 51 which is pivotally mounted in a pivotal mounting 52 by means of a pin 53. The pivotal mounting 52 is rigidly mounted on the apron 13 or the carriage 12 by means of a threaded stud 54 that is an integral part of the pivotal support 52 and is threaded into the apron 13 or carriage 12 as the case may be. The lower portion e of the cantilever element 51 forms a handle by which the cantilever 51 may be rocked in the direction of the arrows A and B as and for purposes as will be later described.

The use and operation of the foregoing described device is as follows: We will assume that the articles to be made are pins of a certain diameter and length, the ends of which are chamfered. Therefore a long piece of stock material 16 of the proper diameter is selected from which to make the pins. This having been done, an adaptor sleeve 20 having a proper size hole 20a therein that will receive the material 16 and provide substantially a running fit for the material 16 is selected and placed in the hole 19 in the work support element 18 and rigidly held therein by means of the screw 21 which may be screwed down tightly against the adaptor sleeve 21. Now by turning the carriage wheel 14 the carriage 12 and all the attached parts thereto may be moved to the rear end of the lathe. This having been done the long piece of material may be placed in the chuck 15 and the end 16a of the material 16 slipped through the hole 20a in the bushing 20 to a point where the tools 44 and 43 can be brought into engagement with the work 16 whereupon the jaws of the chuck 15 may be tightened to rigidly hold the work 16 therein for turning purposes.

The work 16 having been mounted in the machine as above described, the chuck 15 and work 16 held therein are revolved in the usual manner whereupon the handle e may be rocked in the direction of the arrow A whereupon the tool support blade and tools 44 and 43 will be moved to bring the tool 44 into engagement with the work 16 whereupon the tool 44 will make a flat bottom V-shaped cut in the end of the work 16 and the handle e may be advanced in the direction of the arrow A until the desired depth of the V-shaped cut has been made. This having been done, the screw 38 may be adjusted until the end of the screw engages the carriage element 12. This adjustment will limit all future movements of the tool support plate 33 so that all future cuts in the material 16 made by the tool 44 will be the same depth. This having been done the handle e may then be rocked in the direction of the arrow B whereupon the tool support plate 33 will be moved in the opposite direction and the tool 43 will engage the flat bottom of the V-shaped cut made by the tool 44 and by the advancement of the handle e in the direction B the tool 43 will be advanced into the material 16 to a point where the short end of the material 16 will drop off and leave a chamfered end on the material 16 as shown in Fig. 1.

The end of the work 16 having been prepared as above described the carriage wheel 14 is revolved to move the carriage 12 and all parts connected thereto to the left to a point where the distance from the machined end of the work 16 to the right side of the cutting portion of the tool 43 is the length of the pin to be made. This having been done the stop support 25 is moved to its approximately correct position and rigidly locked there by tightening the nut 26b on the bolt 26 to rigidly bind and hold the stop support 25 on the carriage extension 22 as will be readily understood. Now the stop element 30—31 may be slipped to a point where the head 31 of the stop engages the end of the work 16 whereupon the screw 32 may be screwed downwardly to engage and rigidly hold the stop shaft 30 in its adjusted position. The stop 30—31 having thus been adjusted, the handle e may then be rocked first in the direction of the arrow A and then in the direction of the arrow B, whereupon the other end of the first pin will be chamfered and the pin cut off, and at the same time the first end of the second pin is cut square and chamfered. Now the carriage wheel 14 may be turned so that the carriage moves to a point where the stop head 31 engages the end of the work 16 whereupon the handle e is again rocked first in the direction of the arrow A and then in the direction of the arrow B, whereupon the second chamfered ended pin has been completed. This operation is quickly repeated until the carriage and the parts attached thereto have moved the length of the lathe bed and all that length of the work has been cut into the duplicate pins as described.

After the machine has been set up as above described, it is obvious that long lengths of work 16 can be speedily and accurately cut up into the desired lengths and shapes as above described and the efficiency of the workman operating the machine is very much increased.

Attention is called to the fact that due to the design and construction of the machine all the cutting operations take place close up to the work support sleeve or bushing 20 therefore every cut the tools 44 and 45 make are smooth and there is no chattering of the work 16 as the work 16 revolves and the cuts are being made.

Now having fully shown and described my invention, what I claim is:

1. In an attachment for a lathe carriage having a compound support that is movable in a direction transverse the length of the lathe; a carriage extension and a work support, said carriage extension being rigidly attached to one side of the carriage and being positioned between the ways of the lathe, said work support being rigidly attached to the other side of the carriage and projecting upwardly therefrom, a guide in said support, said guide being in axial alignment with the lathe chuck, a stop support, said stop support being supported on said carriage extension and movable toward and away from the work support, and means for rigidly stationing said stop support in adjusted positions along the carriage extension, a stop, said stop being positioned in axial alignment with the lathe chuck and also being adjustably carried by the said stop support, a tool carriage plate, said tool being supported by the carriage and being slidable in a direction transverse the length of the lathe, a pair of tool holders, said tool holders being carried by the said tool carriage plate and being spaced apart and positioned one on either side of the axis of the lathe chuck, a work support and stop, and means in each of said tool holders for removably and adjustably holding a tool in opposed relationship to the other tool, and means for sliding the tool support plate transverse the length of the lathe to bring first one tool and then the other tool into engagement with the work for the purpose set forth.

2. In an attachment for a lathe carriage having a compound support that is movable in a direction transverse the length of the lathe as defined in claim 1, and said means for sliding the tool support plate transverse the length of the lathe comprising in combination with the aforesaid structure a pivotal mounting on the tool support plate, a second pivotal mounting on carriage, a link and a cantilever, said cantilever being pivotally carried on the second said pivotal mounting, and the link being mounted one end on the first said pivotal mounting and the other end being pivotally connected to one end of the cantilever, the other end of the cantilever functioning as a handle for rocking the cantilever.

CHARLES BEIRD.